(12) United States Patent
Del Castillo Miró

(10) Patent No.: US 7,467,641 B2
(45) Date of Patent: Dec. 23, 2008

(54) METERING VALVE FOR HYDROFLUORIC PLANTS

(75) Inventor: José María Del Castillo Miró, Algeciras (ES)

(73) Assignee: Petroquimica Espanola, S.A., Madrid (ES)

( * ) Notice: Subject to any disclaimer, the term of this patent is extended or adjusted under 35 U.S.C. 154(b) by 251 days.

(21) Appl. No.: 10/557,956

(22) PCT Filed: May 21, 2004

(86) PCT No.: PCT/ES2004/000230

§ 371 (c)(1), (2), (4) Date: Aug. 8, 2006

(87) PCT Pub. No.: WO2004/104458

PCT Pub. Date: Dec. 2, 2004

(65) Prior Publication Data

US 2007/0144585 A1    Jun. 28, 2007

(30) Foreign Application Priority Data

May 23, 2003   (ES) ............................... 200301213

(51) Int. Cl.
*F16K 27/02*     (2006.01)

(52) U.S. Cl. ...................................... 137/375; 251/332
(58) Field of Classification Search ................. 137/375; 251/332
See application file for complete search history.

(56) References Cited

U.S. PATENT DOCUMENTS

| | | | | |
|---|---|---|---|---|
| 2,417,351 | A | * | 3/1947 | Covington ................... 508/126 |
| 4,065,302 | A | * | 12/1977 | Turillon .......................... 419/8 |
| 4,621,656 | A | | 11/1986 | Ichimaru |
| 4,714,237 | A | | 12/1987 | Linderman et al. |
| 6,263,904 | B1 | * | 7/2001 | Zdunek et al. ............... 137/375 |
| 6,681,484 | B1 | * | 1/2004 | Nagatsuka et al. ............ 29/860 |

FOREIGN PATENT DOCUMENTS

| | | |
|---|---|---|
| ES | 2 024 281 | 2/1992 |
| GB | 1 394 645 | 5/1975 |

* cited by examiner

*Primary Examiner*—John Fox
(74) *Attorney, Agent, or Firm*—Merchant & Gould P.C.

(57) ABSTRACT

A metering valve for hydrofluoric plants, comprising a flow chamber for the flow of the fluid, housing a plug and having an inlet passage and another outlet passage, a guide body through which the actuator stem for actuating the plug member runs, and an actuator head. The flow chamber internally has guides parallel to the stem which guide the plug. A ring constituted of an iron, copper and nickel alloy is screwed in at the outlet passage.

7 Claims, 4 Drawing Sheets

METERING VALVE FOR HYDROFLUORIC PLANTS

The present invention refers to a metering valve for hydrofluoric plants, the constitution and design of which allow for preventing or considerably reducing the formation and deposition of fluorides on the internal surface of the valve.

More specifically, the valve of the invention is of the type comprising a flow chamber housing a plug and having an inlet passage and an outlet passage located according to perpendicular directions; a guide body through which the actuator stem for actuating the plug member runs, with sealing with regard to the flow chamber; and an actuator head in which a actuator mechanism for actuating said stem is assembled. The plug is assembled between guides parallel to the actuator stem, by means of which the guiding of said plug in its movement is achieved. A seat ring for the plug is assembled in the outlet passage, in the off position.

Valves of the type set forth are already known, for example, by U.S. Pat. No. 4,714,2327, in which the inlet and outlet valves of the flow chamber are located at a right angle, the passage having a seat incorporating a plastic material insert. The valve also has guides for guiding the plug in its upward-downward run.

In U.S. Pat. No. 3,767,159, a valve also having a seat for the plug and guides for guiding the plug in its upward-downward run is disclosed. However, the inlet and outlet passages are in alignment.

Customary valves of the type set forth are not suitable for hydrofluoric acid plants due to the fact that fluorides originating in the conduits are deposited and solidify inside of them, causing a progressive malfunction rendering the valve useless in little time.

The conduction and control of hydrofluoric acid in carbon steel pipes generates salts called iron fluorides, which adhere to the valve walls and to the movable members thereof, as well as a storage of these fluorides in the housings which seals off conventional valves with a standard design.

Adherence of the fluorides to the walls gradually reduces the circulating flow, and adherence to the movable walls creates difficulty of movement for carrying out the correct sealing, both for normal operating use and for emergency cases.

On the other hand, in the case of valves which are always open due to process conditions, the depositions of fluorides in the gate housings completely hinder the leak-tightness which is necessary when they have to be closed, as hydrofluoric acid is involved.

The foregoing requires that these valves be replaced in programmed stops of the alkylation unit, with the resulting cost for repairing the equipment in order to be able to carry out said replacement. Furthermore, the restorations of said valves are costly and take a long time to repair, which obliges having large amounts of fixed assets in the warehouse in terms of spare valves. Spare valves are usually not available because the parts to be replaced, due to the condition they are in, cannot be easily removed.

The present invention has as an object a valve designed for its exclusive use in hydrofluoric acid plants, being designed and constituted such that it prevents the previously indicated drawbacks.

The object of the invention is a shut-off angle valve, with an aerodynamically-shaped internal design for preventing chloride depositions on the walls and in the housings, as well as the adherence of the chlorides on the movable portions of the valve. This design and constitution make circulation of the product, logically with the valve open, be as quick as possible, such that it prevents fluorides from being deposited on the seats.

To achieve the objective set forth, according to one feature of the invention, all the internal movable and sealing portions of the valve are covered with a hydrofluoric acid-resistant iron, copper and nickel based alloy.

The valve plug is constituted of a solid body coated with said alloy. Furthermore, the stroke of this plug is complete, such that in the valve on position, the lower portion of the plug is in line with the upper portion of the side passage or inlet passage of the valve body. The plug is guided in its movement by several guides which are also coated with the same alloy, by means of mechanized welding, and adjusted to its largest diameter.

The sealing ring which is assembled in the outlet passage is also of the previously mentioned alloy and is screwed to the body, having a conical sealing seat. For its part, the plug is double-seated on said ring. This double seat is defined by part of the side surface of the plug, which directly rests on the conical surface of the ring, and by a PTFE (polytetrafluoroethylene) ring, which is assembled on the side surface of the plug and also rests on the conical surface of the ring. In the valve off position, a primary seal is thus arranged, defined by the resting of PTFE on the metal of the ring, and a secondary seal defined by the direct resting of the metal of the plug on the metal of the ring defining the seat, both of a metal based on the previously mentioned alloy, all this thereby allowing the achievement of a perfect leak-tightness in the off position.

The valve guide body, through which the stem runs, internally has, in a position adjacent to the flow chamber, a tapering where a lower bushing is screwed, between which bushing and an upper gland there is a packing which seals the passage of the stem, the bushing and gland being constituted of the same iron, copper and nickel based alloy. The internal surface of the guide body is also covered with this alloy in the section occupied by the previously described components.

The actuator stem for actuating the plug is finished at its lower end in a head with a curved convex surface resting on a curved concave seat of the plug. Support of the head of the stem on the round-shaped plug is thus achieved to allow for optimum axial pressure on the plug when closed. To connect these components, the stem has two bushings, also of the iron, copper and nickel based alloy, assembled near the curved convex head, which are screwed together and house an intermediate packing, the lower bushing being fixed to the plug by welding.

The internal surface of the flow chamber, in the area in which the ring defining the plug seat is assembled, is coated with the previously mentioned alloy by means of welding filler material.

The fixing between the flow chamber and the guide body is carried out in a standard manner, with the interposition of an oval-section, iron, copper and nickel based alloy joint partially housed in annular grooves made on facing support surfaces of the flow chamber and guide body.

The features of the invention, as they are included in the claims, are set forth below in greater detail with the aid of the attached drawings, in which a non-limiting embodiment example is shown.

Figure 1:
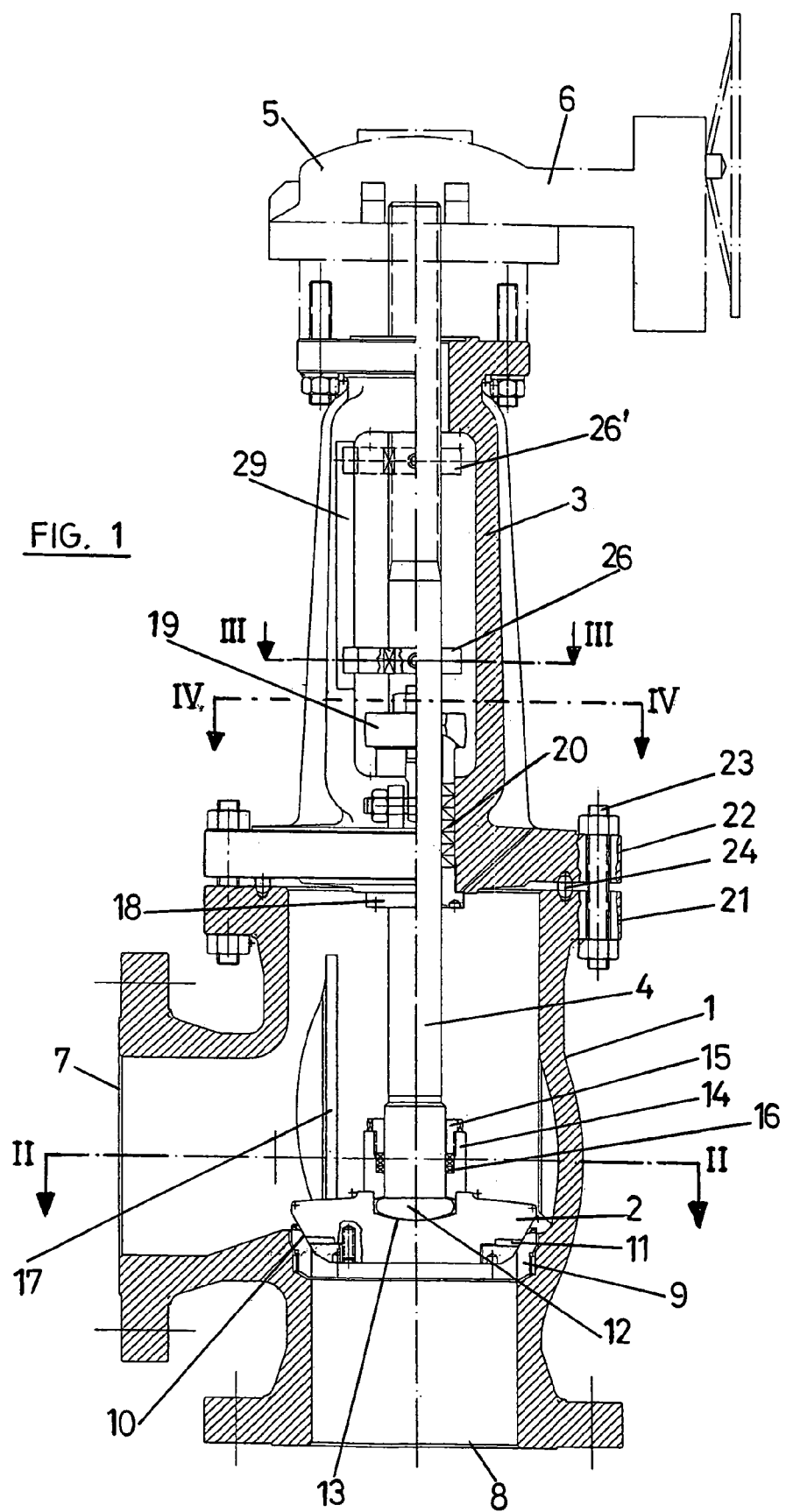
FIG. 1 shows a vertical elevational view of a valve constituted according to the invention, with the flow chamber in section and the guide body in semi-section.

As can be seen in FIG. 1, the valve is made up of a flow chamber 1, which houses the plug 2, of a guide body, though which the actuator stem 4 for actuating the plug 2 runs, and of an actuator head 5, in which an actuator mechanism 6 for actuating the stem 4 is assembled, which can be motorized or manual.

The flow chamber 1 has an inlet passage 7 and an outlet passage 8, both arranged according to perpendicular directions to one another, the outlet passage 8 being in alignment with the actuator stem 4 for actuating the plug 2.

A ring 9 defining the seat for the plug 2 is assembled at the outlet passage 8 and is constituted of an iron, copper and nickel alloy. This ring is fixed to the outlet passage by means of screwing, the internal surface of the outlet passage in which the ring is screwed also being coated with the same alloy. The ring 8 has a conical-shaped surface or internal seat 10.

The plug 2 is constituted of a body coated with the same aforementioned iron, copper and nickel alloy, having a double seat on the ring 9. This double seat is defined in part by the plug 2 itself resting directly on the ring 9, and in part by a PTFE ring 11 which is assembled on the side surface of the plug, such that it also rests on the conical surface of the ring 9. Leak-tightness of the valve in the off position is ensured with this double seat.

The stem 4 is finished at its lower end with a head 12 with a curved convex surface which rests on a seat 13, with a curved concave surface, made on the plug 2. Optimal axial pressure on the plug is achieved with this mutual support when the valve is actuated to the off position. The attachment between the stem 4 and plug 2 is achieved by means of two bushings 14 and 15 screwed together, between which bushings a packing 16 is arranged. The bushings 14 and 15 are of the same iron, copper and nickel alloy. Bushing 14 is furthermore attached to the plug 2 by welding.

Figure 2:
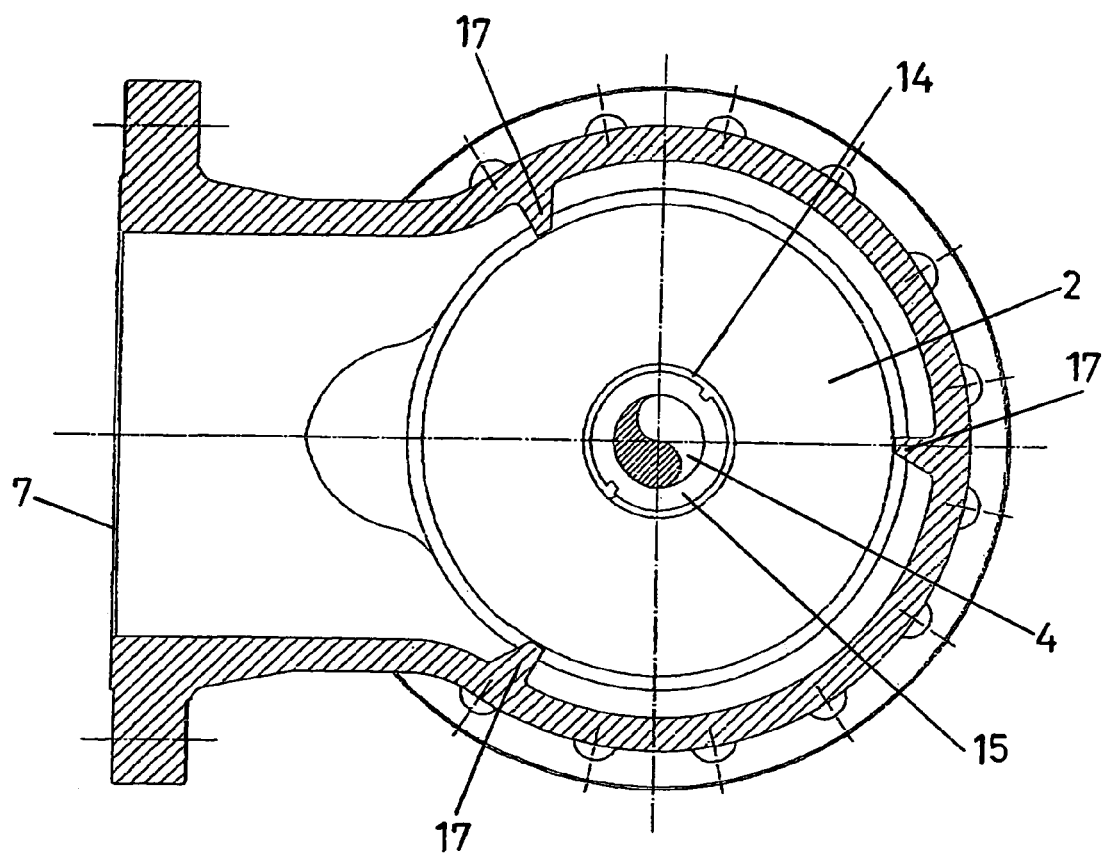
FIGS. 2, 3 and 4 show cross sections of the valve, taken along section lines II-II, III-III and IV-IV of FIG. 1, respectively.

The flow chamber 1 internally has guides 17, FIGS. 1 and 2, which are coated with the aforementioned iron, copper and nickel based alloy by mechanized welding.

In the maximum aperture position, the plug 2 has its surface or lower base in alignment with the upper edge of the inlet passage 7. In other words, the plug stroke is complete which, in combination with the internal configuration of this chamber and the coating of the movable surfaces thereof, causes the obtainment of an aerodynamic shape to prevent depositions of fluorides on the walls and in the housings, as well as to prevent their adherence on the movable portions. With the valve open, circulation of the fluid will be very fast, preventing fluorides from being able to be deposited on the seats.

As can be seen in FIG. 1, the guide body 3 has a tapering at its lower portion where a lower iron, copper and nickel alloy based bushing 18 is screwed. The internal surface of the guide body 3 where the threading is carried out is also coated with this same alloy. Furthermore, a graphite joint is arranged between the lower flaring of the bushing 18 and the guide body 3. On the upper portion of the same tapering, a gland 19 made of the same alloy is arranged, between which gland and the bushing a packing 20 is assembled which seals the passage of the stem 4.

The chamber 1 and the guide body 2 are finished off at their end sections with flanges 21 and 22 which are fixed by means of pins 23. Arranged between these flanges is an oval-section iron, copper and nickel alloy based joint 24, which is partially housed in facing channels of the two flanges.

Figure 4:
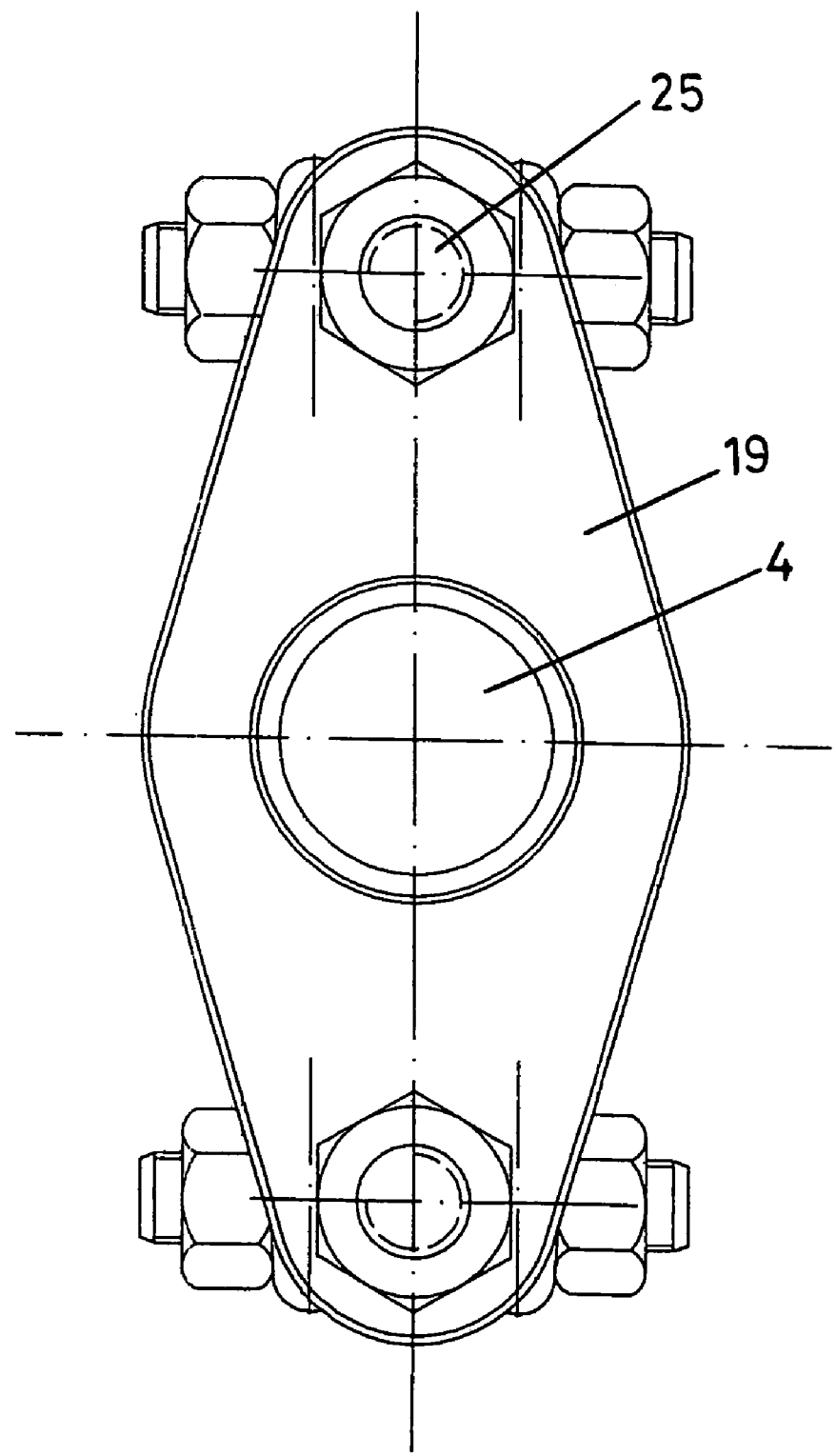

As can be seen in FIG. 4, the gland 19 is fixed by means of bolts 25.

Figure 3:
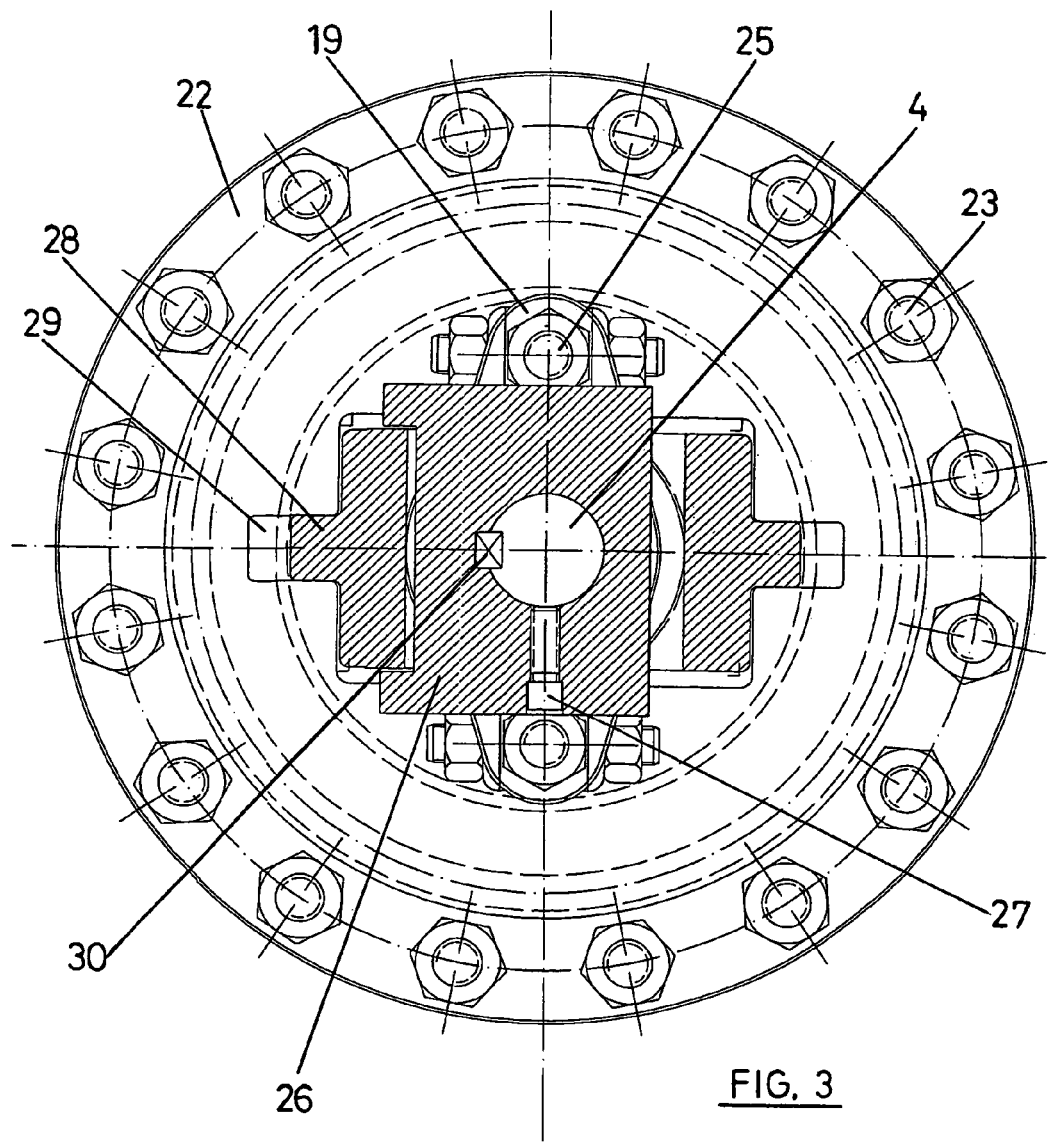

As can be seen in FIGS. 1 and 3, above the gland 19, the rod 4 incorporates a part 26 fixed thereto by means of a screw 27, which part has external axial projections 28 which can move over axial channels 29 of the body 3, the movement of part 26 between lower and upper limit positions limiting the length of these channels 29, the first of which positions is shown in FIG. 1 with a solid line and the second one with a dashed line and having reference number 26'. The body 26 is linked to the stem 4 by means of the screw 27 and cotter pin 30.

With the constitution set forth, the stem 4 with the plug 2 move vertically without rotating, guided by the guides 17, and the plug stroke is limited by means of the body 26 and axial channels 29. With the constitution described, a valve is provided in which the flow chamber 12, in the open position of the plug 2, allows for a fast circulation which eliminates or reduces the risk of depositions and adherences of fluorides, a circumstance which is furthermore favored by the constitution and coating of the parts or movable members based on said alloy.

The invention claimed is:

1. A metering valve for hydrofluoric plants, comprising a flow chamber for the flow of the fluid, housing a plug and having an inlet passage and another outlet passage located according to perpendicular directions; a guide body through which the actuator stem for actuating the plug member runs, with a sealing with regard to the flow chamber; and an actuator head in which the actuator mechanism for actuating said stem is assembled; which flow chamber internally has guides parallel to the actuator stem, between which guides the plug is assembled and guided, and with a ring on the outlet passage for the seating of said plug, wherein the plug is constituted of a body coated with a hydrofluoric acid-resistant iron, copper and nickel based alloy, having a double seat on the ring assembled at the outlet passage, and in the maximum aperture position, it is situated with the lower base in alignment with the upper edge of the inlet passage, said body being guided in its movement between the on and off positions by guides which are coated with the same iron, copper and nickel alloy; and in that the guide body internally has, in a position adjacent to the flow chamber, a tapering where a lower bushing is screwed, between which bushing and an upper gland a packing is assembled which seals the passage of the stem, said bushing and gland being constituted of an iron, copper and nickel based alloy, and the guide body being coated with the same alloy in the section occupied by these components.

2. A valve according to claim 1, wherein the stem is finished off at its lower end with a head having a curved convex surface, resting on a curved concave seating of the plug and has two iron, copper and nickel based alloy bushings assembled thereto, close to said head, which bushings are screwed together and house a packing, the lower bushing being fixed to the plug by welding.

3. A valve according to claim 1, wherein the bushing of the outlet passage is of an iron, copper and nickel based alloy and is fixed to said passage by means of screwing on an area also coated with the same alloy, the ring internally having a conical surface on which the plug rests or sits.

4. A valve according to claim 3, wherein the double seat of the plug on the ring at the outlet passage is defined by part of the side surface of the plug, which rests directly on the conical surface of said ring, and by a PTFE ring which is assembled on the side surface of the plug and which also rests on the conical surface of the ring.

5. A valve according to claim 1, wherein the flow chamber and the guide body have support and connection flanges between which an oval-section joint, constituted of an iron, copper and nickel based alloy, is partially housed in grooves made on facing surfaces of both flanges.

6. A valve according to claim 1, wherein the internal surface of the guide body on which the threading is made for screwing in said bushing is coated with the same alloy as the plug, and in that said bushing is finished off at its lower end with a flaring which rests on the guide body, with the interposition of a graphite seat joint.

7. A valve according to claim 1, wherein above the section traversing the tapering of the guide body, the stem has a part fixed thereto which rests against upper and lower stops of said body in the limit positions of the stem, limiting the movement thereof and of the plug.

* * * * *